United States Patent [19]

Sellner et al.

[11] 4,288,781
[45] Sep. 8, 1981

[54] CURRENCY DISCRIMINATOR

[75] Inventors: Harvey R. Sellner, Newtown; Robert T. Wada, Ridgefield, both of Conn.

[73] Assignee: The Perkin-Elmer Corporation, Norwalk, Conn.

[21] Appl. No.: 60,090

[22] Filed: Jul. 24, 1979

Related U.S. Application Data

[63] Continuation of Ser. No. 960,156, Nov. 13, 1978.

[51] Int. Cl.³ .............................................. G06K 9/00
[52] U.S. Cl. ........................... 340/146.3 Q; 209/534; 235/454; 250/567; 340/146.3 R
[58] Field of Search ............... 194/4 R, 4 E; 209/534; 235/449, 493, 454; 356/71; 250/567; 340/146.3 C, 146.3 Q, 146.3 S, 146.3 R

[56] References Cited

U.S. PATENT DOCUMENTS

| | | | |
|---|---|---|---|
| 3,280,974 | 10/1966 | Riddle et al. | 209/534 |
| 3,480,785 | 11/1969 | Aufderheide | 250/567 |
| 3,496,370 | 2/1970 | Haville et al. | 209/534 |
| 3,509,535 | 4/1970 | Bervbe | 340/146.3 C |
| 3,679,314 | 7/1972 | Mustert | 356/71 |
| 3,725,667 | 4/1973 | Schwartz | 209/534 |
| 3,778,628 | 12/1973 | Novak et al. | 209/534 |
| 3,845,466 | 10/1974 | Hong | 340/146.3 S |
| 3,870,629 | 3/1975 | Carter et al. | 340/146.3 C |
| 4,041,456 | 8/1977 | Ott et al. | 340/146.3 Q |

*Primary Examiner*—Leo H. Boudreau
*Attorney, Agent, or Firm*—S. A. Giarratana; E. T. Grimes; T. P. Murphy

[57] ABSTRACT

A currency discriminator for determining the denomination of a bank note or the like is disclosed. It includes a source of light directed at the note to be identified. A 2 mm×80 mm stripe is illuminated and the reflected light from the illuminated area is measured by a detector and converted into a digital representation. Synchronizing hardware permits 72 samples, each from a 2 mm×80 mm area, to be generated as a bank note is moved past the illuminator. The digital representations are then utilized to develop a four bit correlation number N where each bit is a one if $(P_n > P_{n-2})$, $(P_n > P_{n-4})$, $(p_n > P_{n-6})$, and $(P_n > P_{n-8})$ where $P_n$ is the present sample and $P_{n-2}$, for example, is the second previous sample. The correlation number N is then compared with the corresponding number in a master list for notes of different denomination. A correlation count is incremented for each denomination where a comparison is found between the actual correlation number N and the number $N_x$ in the list where x represents a note denomination. If the ratio of the highest correlation count for one bank note to the next highest correlation count is equal to or greater than 1.28 and the larger correlation count is at least 28, the bank note is identified.

9 Claims, 19 Drawing Figures

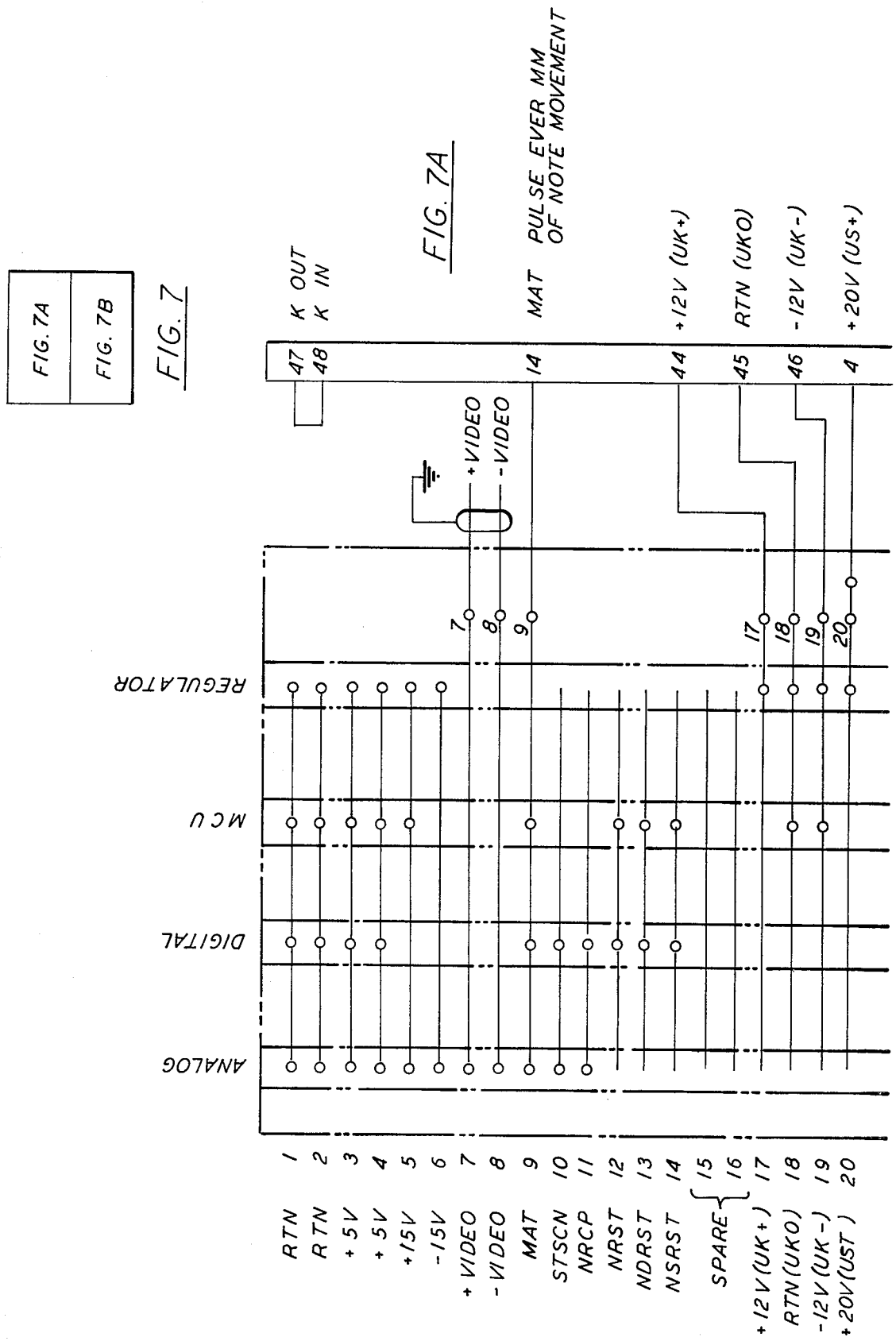

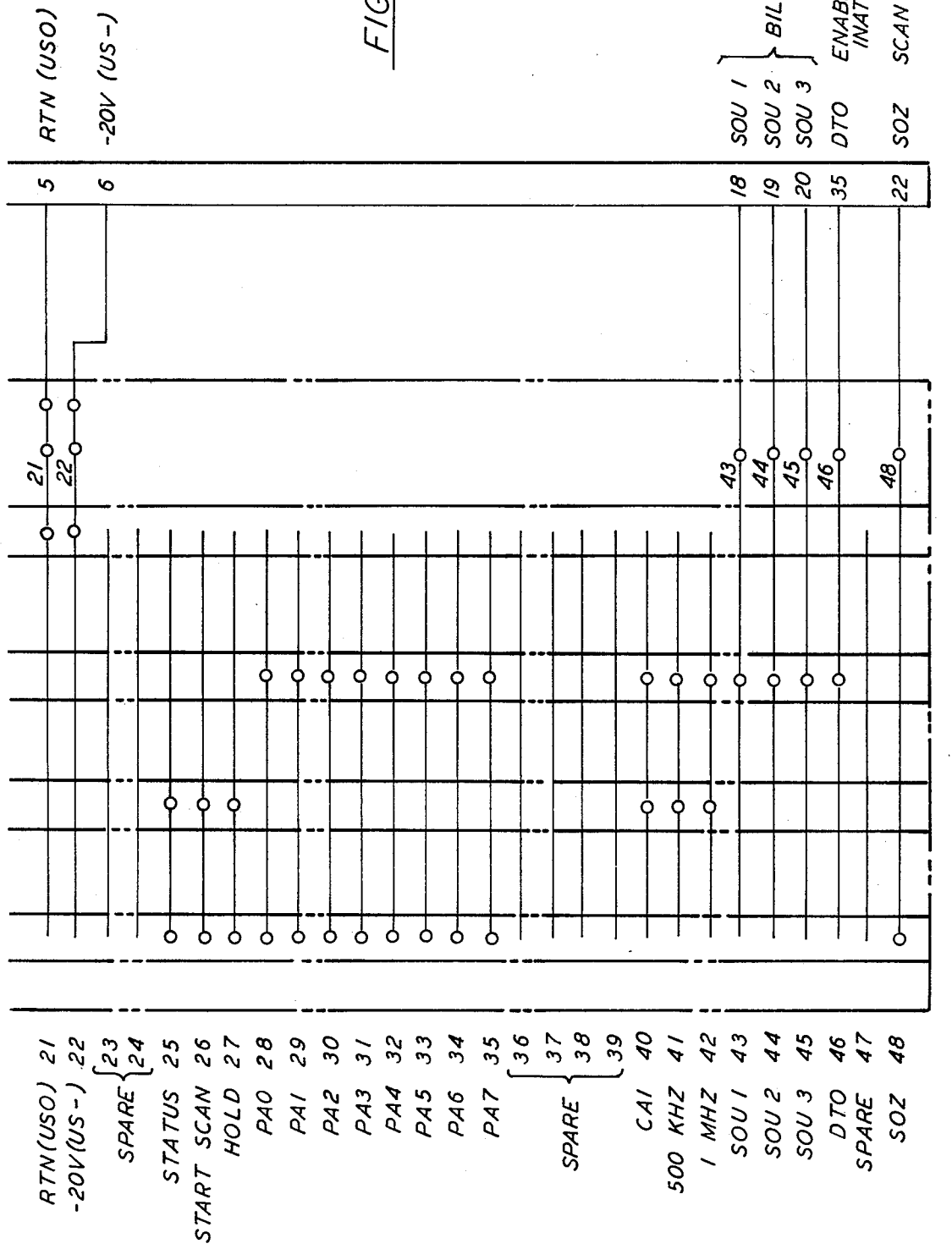

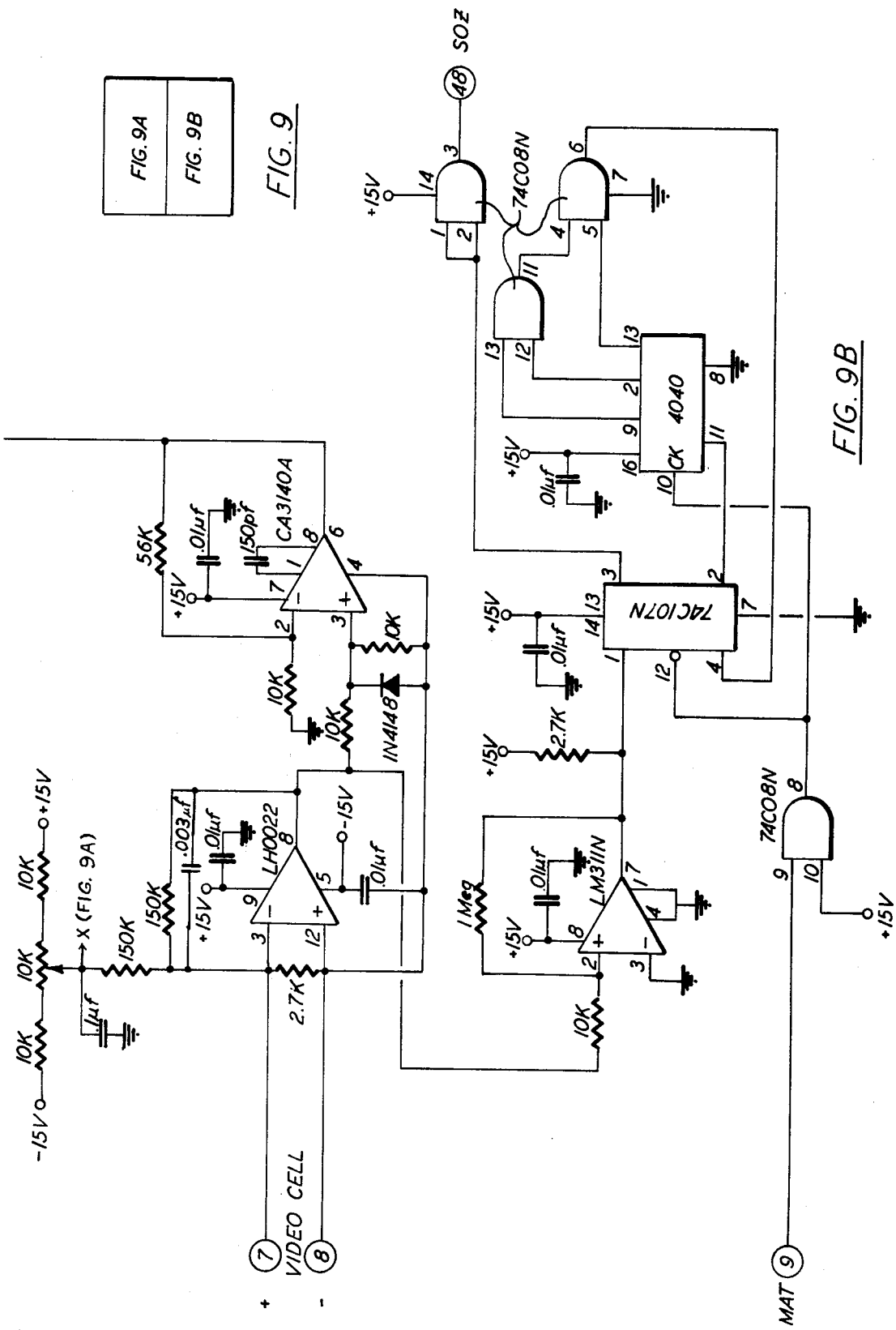

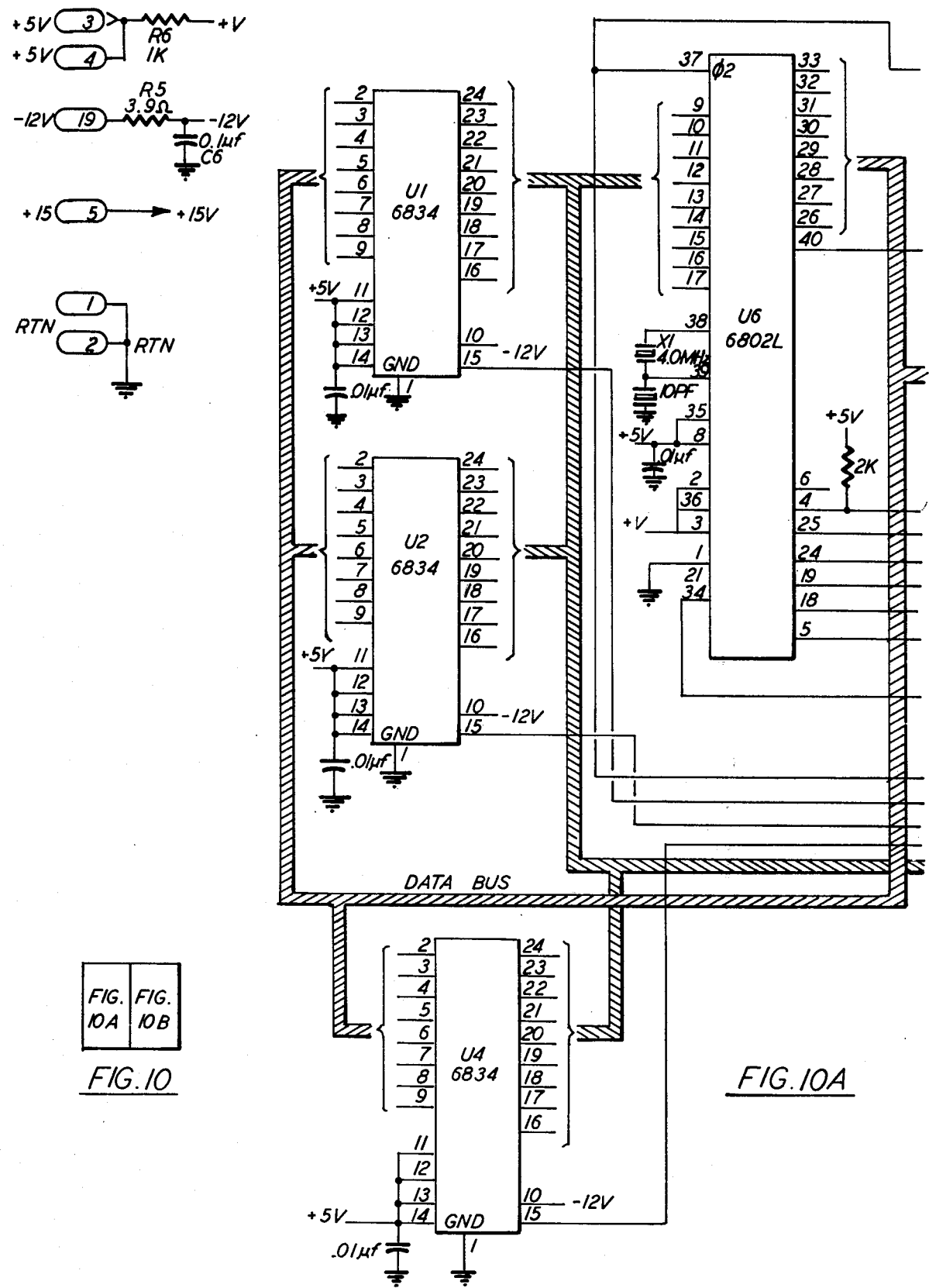

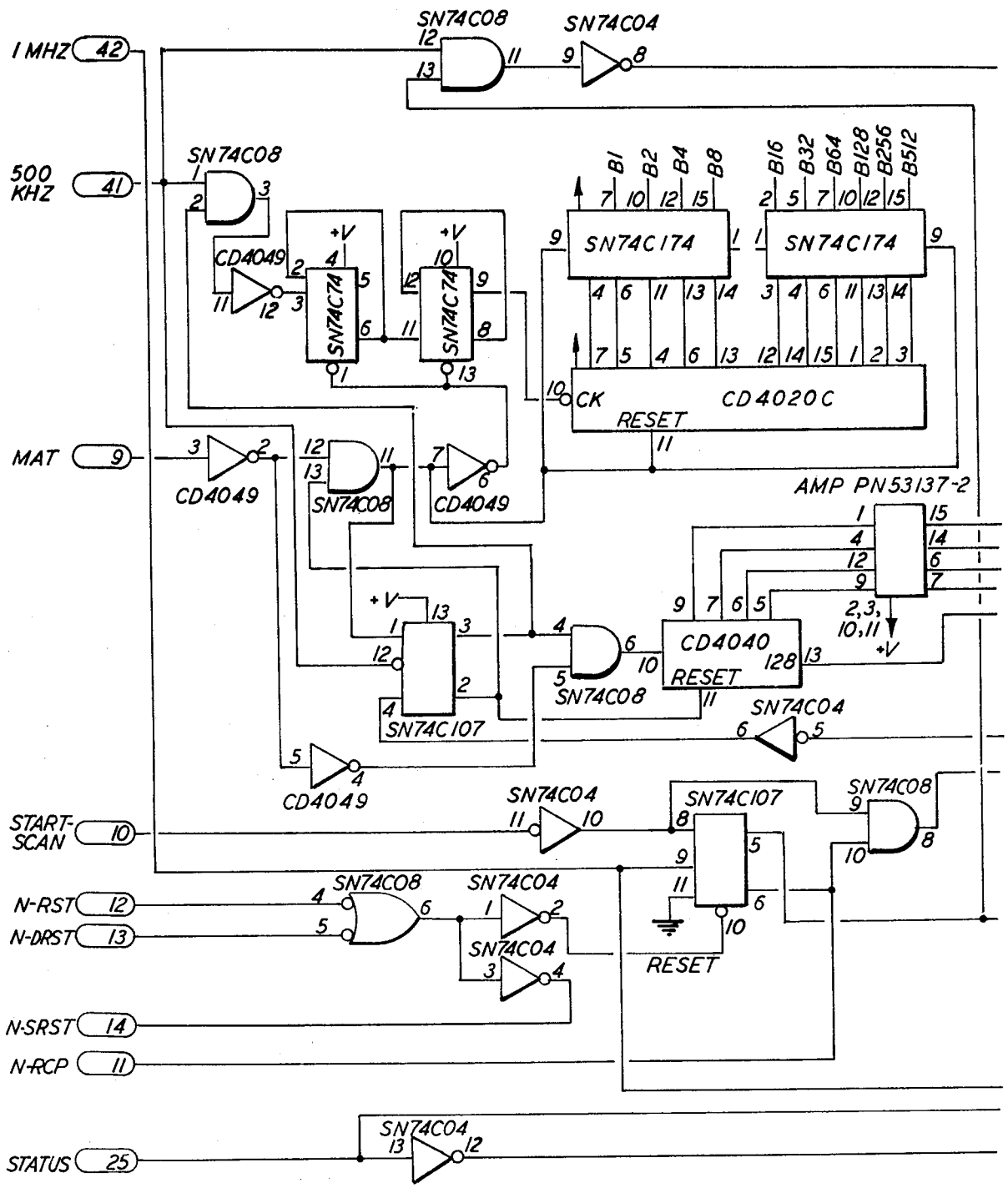
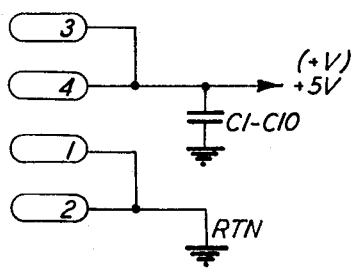
FIG. 11A
FIG. 11

CURRENCY DISCRIMINATOR

This is a continuation of application Ser. No. b 960,156, filed Nov. 13, 1978.

BACKGROUND OF THE INVENTION

This invention relates generally to automated banking equipment and particularly to an automatic currency discriminator for currency counting machines and the like.

In the field of banking and particularly in the field of automated banking, many sophisticated machines have been developed in recent years which are useful in automating many of the heretofore manual operations performed in the banking industry. Of particular concern has been automated equipment for identifying the denomination of currency. For example, U.S. Pat. No. 3,679,314, different spectral distributions of a bill are sensed in order to identify its denomination. In U.S. Pat. No. 3,870,629, phase locked loops are utilized in detecting the frequency characteristics of each bill being checked. In U.S. Pat. No. 3,280,974, the changes in magnetic flux of a bill moving past a sensor is utilized in identifying the bill denomination. The output of a photodetector is processed by the apparatus disclosed in the U.S. Pat. No. 3,845,466, so as to form a probability density function which is compared with a prestored function. In U.S. Pat. No. 4,041,456, the reflectivity from one or more areas on the bill to be identified is measured and compared with the reflectivity of a bill as indicated by data in a storage device. Favorable comparison operates to identify the currency denomination.

Many of the foregoing techniques are either excessively complicated making high speed verification difficult or they lack the required accuracy for application in the banking industry. Furthermore, those patents describing approaches which are complicated also suffer from being rather costly to implement, regardless of its operation speed.

It is, therefore, a principle objective of the present invention to provide a currency discriminator particularly useful in high speed automated banking devices such as currency counters.

It is further objective of the present invention to provide a currency discriminator which is fast operating and highly accurate.

BRIEF DESCRIPTION OF THE INVENTION

The currency discriminator according to the present invention utilizes a sensor arrangement for optically scanning bank notes or the like as they pass by a sensor. A source of light is arranged relative to the sensor so as to direct the light toward one surface of the bank note whose denomination is to be determined. The sensor measures the reflected light from an area on the note itself typically comprising a rectangular area 2 mm × 80 mm which extends from the top of to the bottom of the bank note sought to be identified. A pluarlity of such measurements are taken extending from one edge to the other edge of the note as it passes by the sensor. Each of these sensed reflectances are stored digitally and once the reflectances are stored, a plurality of multibit correlation numbers are formed where the first bit of such number is a one if $P_n$ is greater than or equal to $P_{n-2}$, otherwise the first bit is zero. The second bit of each correlation number is a one if $P_n$ is greater than or equal to $P_{n-4}$, otherwise it is zero as well. The third bit is a one if $P_n$ is greater than or equal to $P_{n-6}$, otherwise the third bit is zero. The fourth bit is one if $P_n$ is greater than or equal to $P_{n-8}$, otherwise the fourth bit is zero.

Each multibit correlation number so formed is then compared with previously stored multibit numbers which comprises a four bit correlation number derived from scanning a corresponding section of a master or known note. If the multibit correlation number from the scanner is the same as the multibit correlation number in storage, a correlation count for a particular denomination is incremented.

After the bank note has been scanned, the correlation count related to each possible denomination which can be detected by the discriminator is compared with each other. So long as the ratio if the largest correlation count to the next highest correlation count is 1.28 or greater and the largest correlation count is at least 28, the note is identified.

BRIEF DESCRIPTION OF THE DRAWINGS

The foregoing and other objects, advantages and features of the present invention are described in greater detail below in connection with the drawings wherein:

FIG. 7 shows how the wiring diagram of FIGS. 7A and 7B fit together;

DETAILED DESCRIPTION

Figure 1:
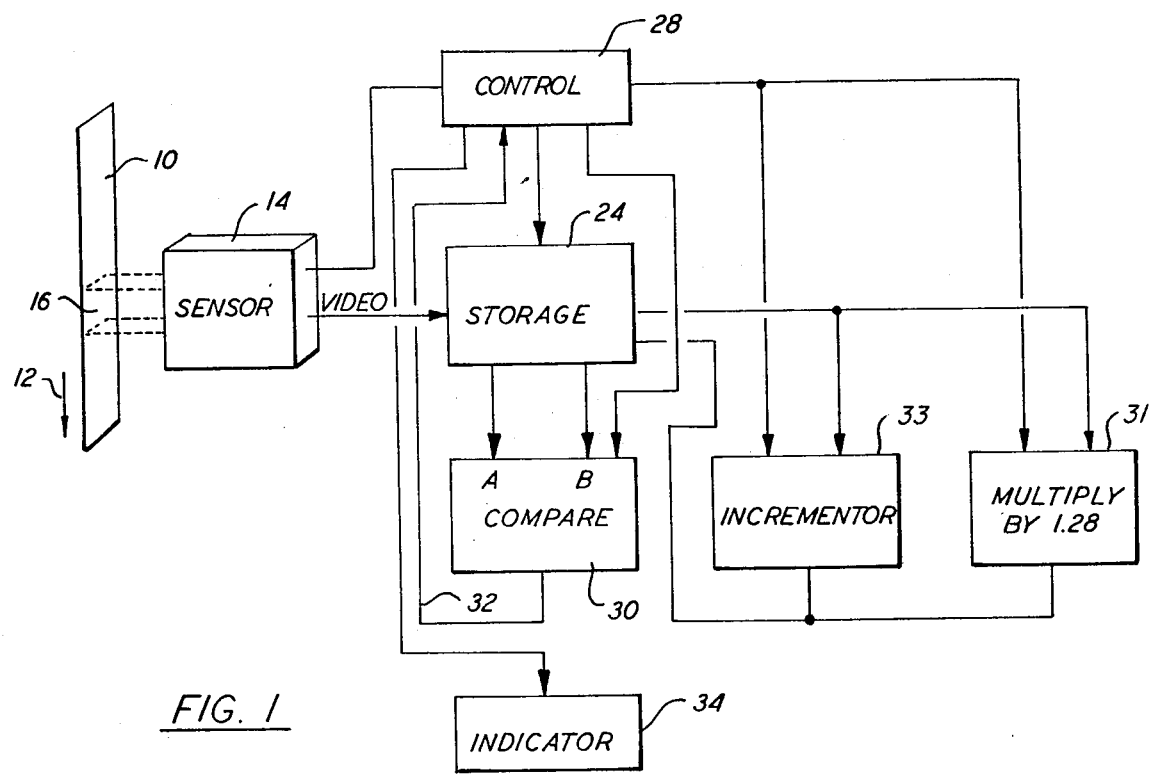
FIG. 1 is a block diagram of the electronic circuitry for the currency discriminator according to the present invention.

Referring now to FIG. 1, a system diagram for the currency discriminator according to the present invention is shown. In this diagram, a bank note 10 is shown symbolically moving the direction of the arrow 12 past a bank note sensor 14 by any suitable transport mechanism (not shown). The sensor 14 is arranged so that an area on the bank note, indicated at 16, is illuminated and the light reflected therefrom is sensed by the sensor 14. The sensor 14 is a light intensity sensor which outputs a digital representation for light which strikes it.

Figure 1A:
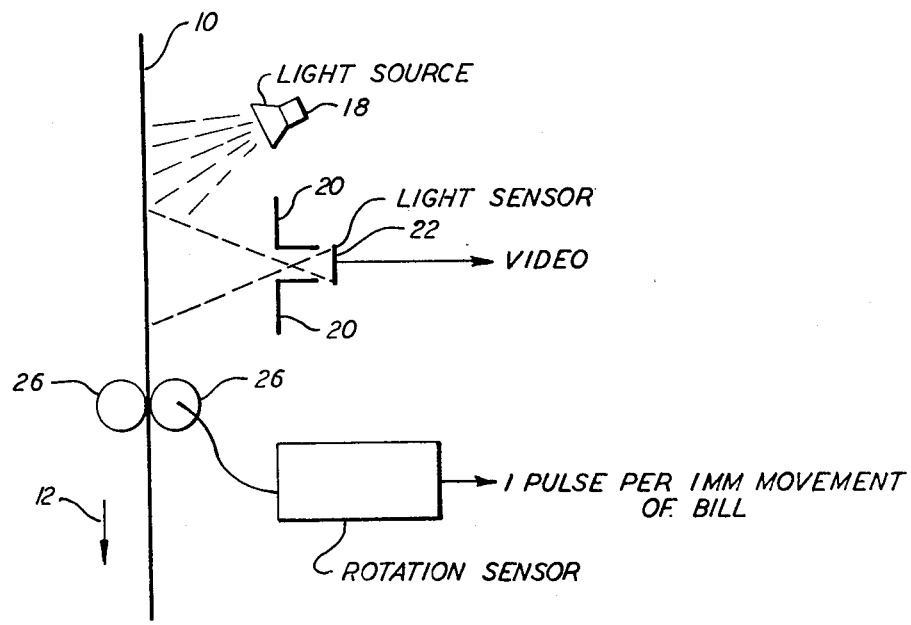
FIG. 1a shows the sensor of FIG. 1 in diagramatic form.

One form of sensor is shown in greater detail in FIG. 1a wherein the bank note 10 travels in the direction of the arrow 12. A light source 18 illuminates the surface of the bank note 10 so that light is reflected therefrom through a shield assembly 20 to a light sensor 22. The shield assembly 20 is physically arranged with respect to the light sensor 22, the light source 18 and the bank note 10 in such a manner that light reflected from a rectangular area approximately 2 mm × 80 mm on one side of the bank note 10 is detected by the light sensor 22. The analog output of the light sensor 22 is placed on the line labeled video which, as is described in greater detail below, is stored in a storage device 24, as shown in FIG. 1.

In addition to providing an analog output correlated to the reflected light from a rectangular area on the bank note 10, the sensor 14 includes a bank note distance traveled sensor which will produce a pulse each time the bank note 10 travels a known distance such as 1 millimeter in the direction of arrow 12. One possible means for implementing such a sensor is to provide two rollers 26 of known dimension which are urged toward each other to form a nip through which the bank note 10 might pass. One of the rollers 26 is coupled to a rotation sensor which may include a disc with holes or slots in it through which light may pass. A photo sensor cooperates with the disc to produce an electric pulse each time the roller 26 turns a predetermined distance. By properly selecting the dimensions of the rollers 26 as well as the slotted wheel, such an arrangement can produce a pulse everytime the bank note 10 travels a distance of one millimeter.

The distance traveled pulses from the circuitry shown in FIG. 1a are utilized by the control 28 of FIG. 1 to determine when the video should be sampled to make certain that a different area is sampled than was previously sampled. For the arrangement where it is desired to determine the reflectance of light from an area 2 millimeters by 80 millimeters and the distance traveled pulses occur once for every 1 millimeter of note travel, every other pulse from the rotation sensor of FIG. 1a is utilized to cause the video output to be stored in the storage 28.

The circuit of FIG. 1 additionally includes a comparator 30 for producing a signal on its output line 32 whenever the input to terminal A is greater than that at terminal B. Such comparators are well known in the computer art and need not be described further.

The circuit of FIG. 1 also includes an incrementor 33 whose operation is directed by the control circuit 28 to increment a number received from the storage 24 and add one to that number and return it to storage 24. The system of FIG. 1 further includes a multiplication unit which is operative to multiply data received from the storage 24 under the direction of the control circuit 28 to produce a number which is 1.28 times greater than that input to the multiplier 31. Incrementor and multiplication units are also well known in the digital computer art and, therefore, further description of such units is not required.

The circuit of FIG. 1 also includes an indicator 34 which is coupled to the control 28 and responds thereto to indicate the identity of the denomination for the bank note 10.

In operation, the circuitry of FIG. 1 is first operative to store a decimal representation for the output from the sensor 14 into the storage 24. This is accomplished by means of the fact that every other pulse received from the rotation sensor shown in FIG. 1a causes a digital representation to be stored in the storage 24. For present day United States Federal Reserve Notes, once 72 such samples have been taken across the reverse side of the bank note 10, sufficient data is available in the storage 24 to determine the denomination of the note itself. It should be noted that the reverse side of the note, i.e., the side of a note not containing a portrait, is utilized for denomination discrimination because it contains more information revelant to the denomination of the note than does the front side.

Figure 2:
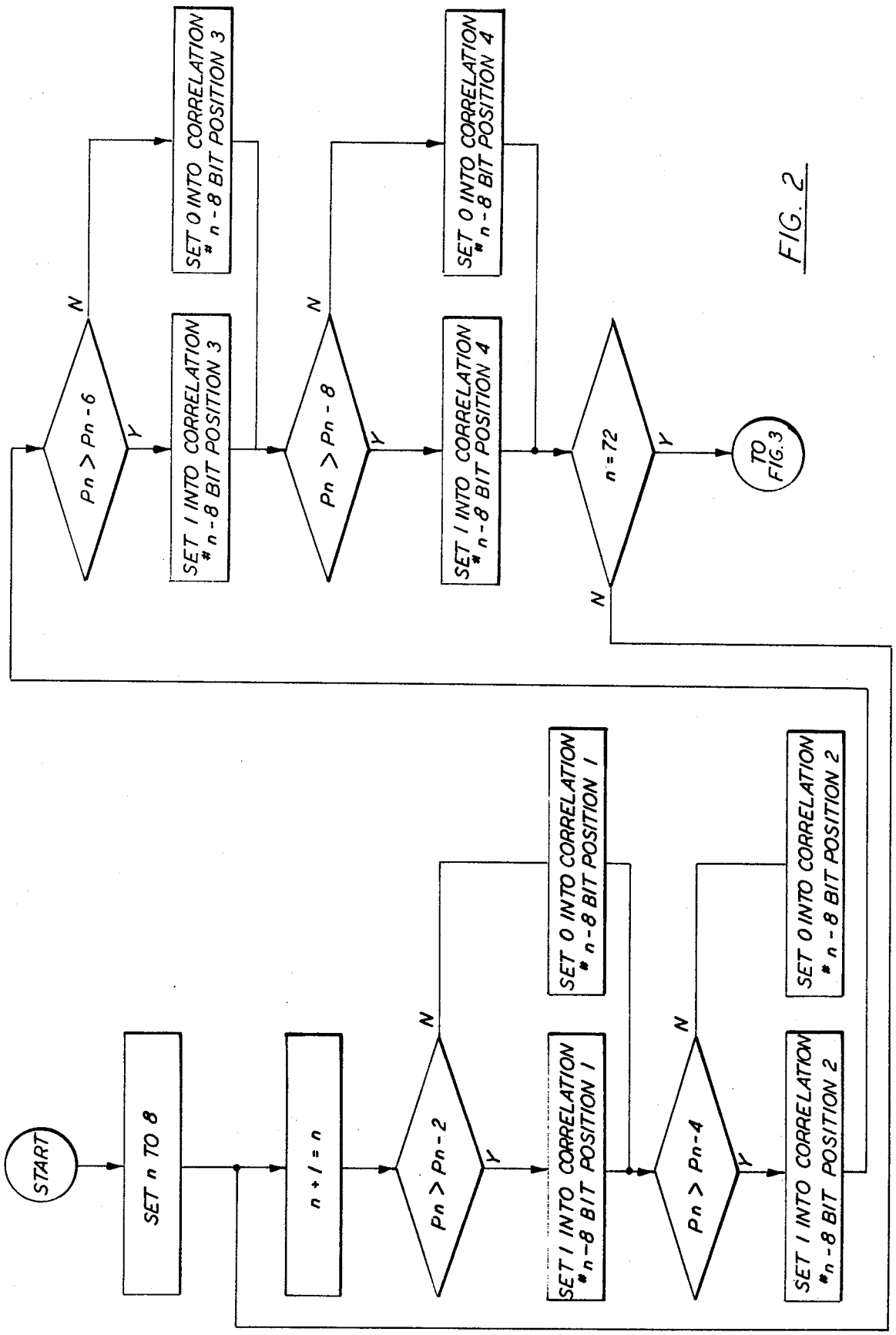
FIG. 2 shows the manner in which the control circuit of FIG. 1 is operable to cause the remaining circuitry to form a multi-bit correlation number N.

When at least 9 samples $P_n$ (where n is an integer between 1 and 72) have been stored in the storage unit 24, the control 28 is operative in a manner as shown in FIG. 2 to operate the systems to generate a plurality of multi-bit correlation numbers N. As shown in FIG. 2, n is first set to 8 and then incremented to 9. Then the digital representation for the sample $P_9$ is compared with the second previous sample, i.e., sample $P_7$. If $P_9$ is greater than or equal to $P_7$, a 1 is set in the first bit position for correlation number one. On the other hand, if $P_9$ is less than $P_7$, a zero is placed into bit position one of correlation number one. Thereafter, $P_9$ is compared with the fourth previous sample $P_5$ and if the former is greater than or equal the latter, a one is set into the second bit position of correlation number one. On the other hand, should $P_9$ be less than $P_5$, a zero is placed into the second bit position of correlation number one.

Next the control 28 determines whether $P_9$ is greater than or equal to the sixth previous sample $P_3$. If it is, a one is placed into the third bit position of correlation number one and if it is not, a zero is placed into the third bit position of correlation number one. Thereafter, the control 28 determines whether $P_9$ is greater than or equal to the eighth previous sample $P_1$. If it is, a one is set into the fourth bit position of correlation number one and if it is not, a zero is placed into the fourth bit position of correlation number one.

Thereafter, the control 28 determines whether n is equal to 72 which would be the case if all the available data had been utilized to form correlation numbers. It will be observed, however, that only 64 such correlation numbers are formed because at the outset of the sequence shown in FIG. 2, n is set to 8 so that only that 64 such correlation numbers can be generated for each bank note tested. If it is determined that n is not equal to 72, then n is incremented and a further correlation number is formed in accordance with the sequence as shown in FIG. 2. On the other hand, if n is equal to 72, all 64 correlation numbers have been formed and the control 28 can move on to determining whether the correlation numbers are equal to previously stored correlation numbers for known denominations. The control sequence for determining the equality of correlation numbers is shown in FIG. 3.

Figure 3:
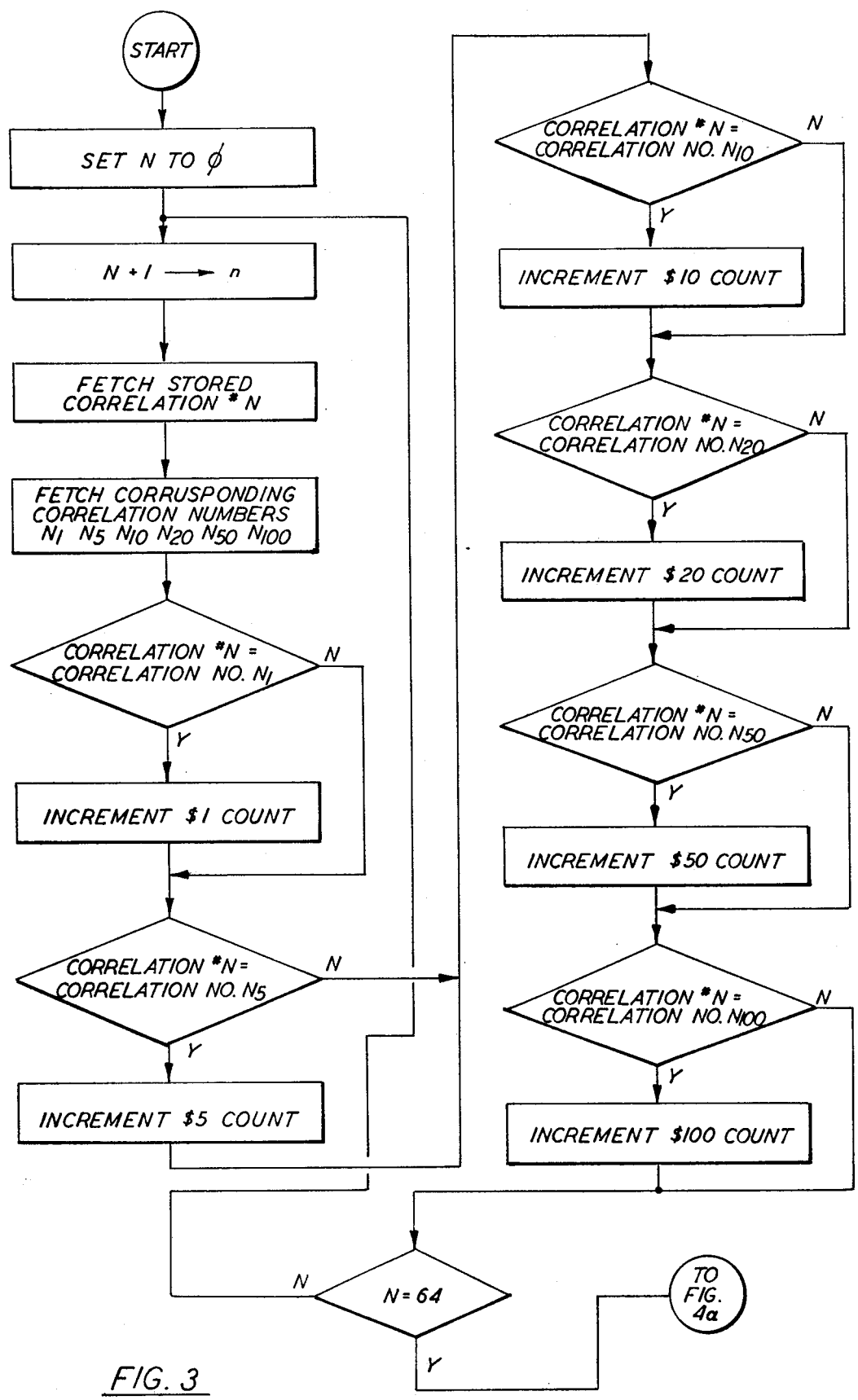
FIG. 3 shows the manner in which the control operates the remaining hardware so as to determine the largest correlation number N.

Referring now to FIG. 3, the control 28 first causes a number N to be set to zero and subsequently incremented by one. Thereafter, the correlation number N is fetched from memory. Subsequently, the correlation numbers $N_1$, $N_5$, $N_{10}$, $N_{20}$, $N_{50}$ and $N_{100}$, which correspond to the expected correlation number for respectively $1.00, $5.00, $10.00, $20.00, $50.00 and $100 notes, are fetched from memory as well. Then, the current correlation number N is compared with the corresponding correlation number N, for a $1.00 bill. If the two are equal, a $1.00 count is incremented. In either case, however, the control then jumps to a comparison of the current correlation number N with the corresponding number $N_5$ for a $5.00 note. In the event correlation number N equals correlation number $N_5$, the $5.00 count is incremented. If not, the control jumps to a further comparison of the current correlation number N with the correlation number $N_{10}$. The process continues in the manner shown in FIG. 3 whereby the current correlation number N is compared with a corresponding correlation number for each particular denomination for which the apparatus is capable of identifying. In the event that the current correlation number N is equal to a corresponding correlation number $N_x$, the corresponding determination count is incremented.

Once the current correlation number N has been compared with all corresponding correlation numbers $N_x$, the control checks to determine whether N is equal to 64. If not, the process is repeated for a subsequent value of N.

On completing the sequence of events shown in the flow chart of FIG. 3, the system according to FIG. 1 has a $1.00, $5.00, $10.00, $20.00, $50.00 and $100.00 count where the count indicates the number of times that one correlation number N corresponded to a corresponding correlation number $N_x$ for that particular denomination of bank note.

It should be noted that the above analysis assumes each bill is either right side up or up side down as it passes the sensor. The system can be expanded easily to check for notes which are not always arranged the same way, i.e., the notes may be either upside down or right side up. This added feature is accomplished by comparing the current correlation number N with all corresponding correlation numbers $N_x$ for bills right side up and with a further set of corresponding correlation numbers $N_x$ for bills up side down. Those of skill in the art will also recognize that this modification may also be adapted to permitting the system to identify other denomination notes such as the $2 note.

Statistical analysis has demonstrated that when the largest count, as determined by the sequence shown in FIG. 3, is at least 1.28 times larger than the next largest count and is at least equal to 28, then the bank note corresponds to that identified by the particular denomination count which is largest. For example, if the $5.00 count is at least 28 and at least 1.28 times greater than the $1.00, $10.00, $20.00, $50.00 and $100.00 count, then the denomination of the note under test is a $5.00 note.

Figure 4A:
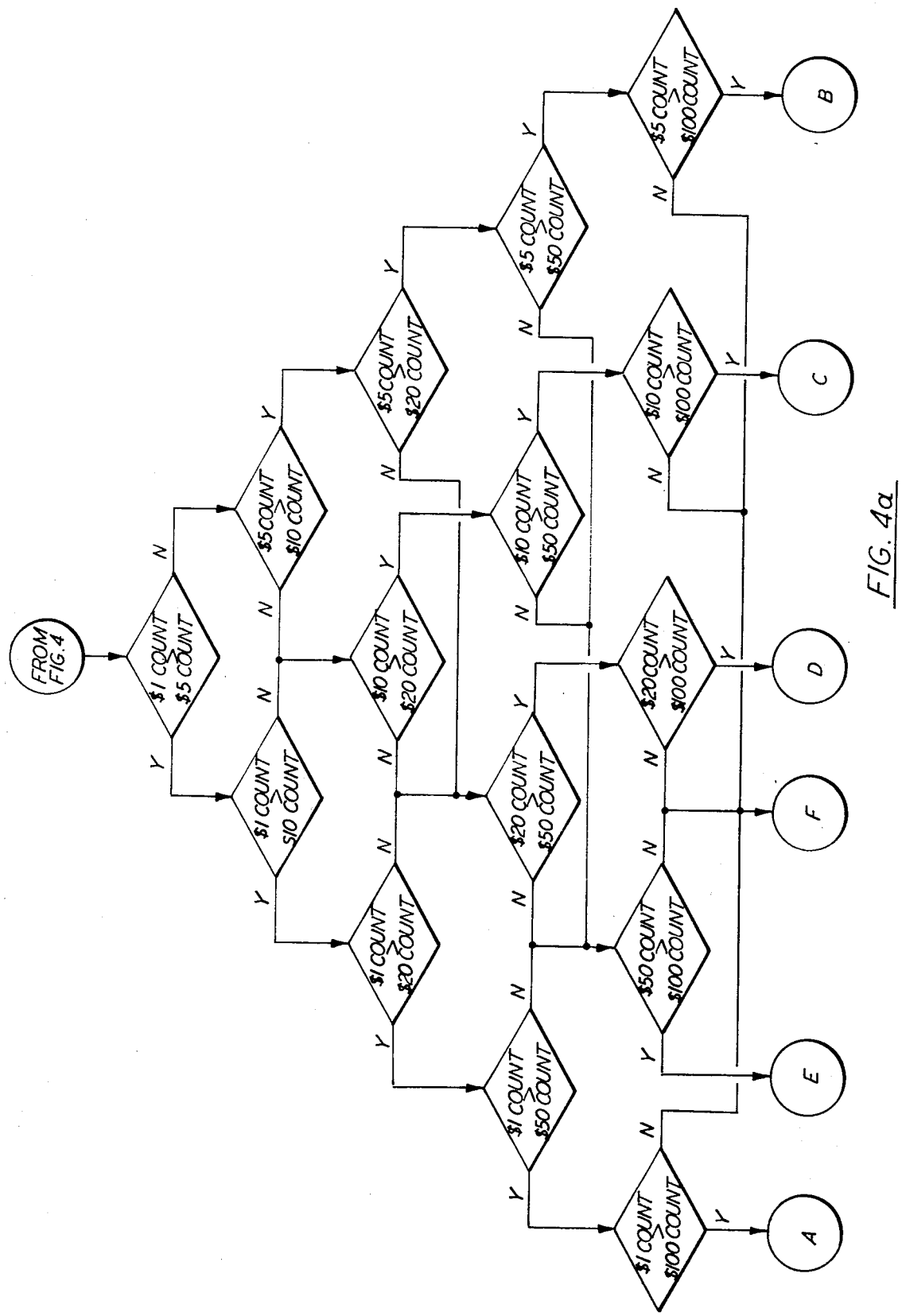
FIGS. 4a, 4b and 4c show how the controls determine whether the largest correlation count is equal to or greater than 1.28 times the next largest correlation count.
Figure 4B:
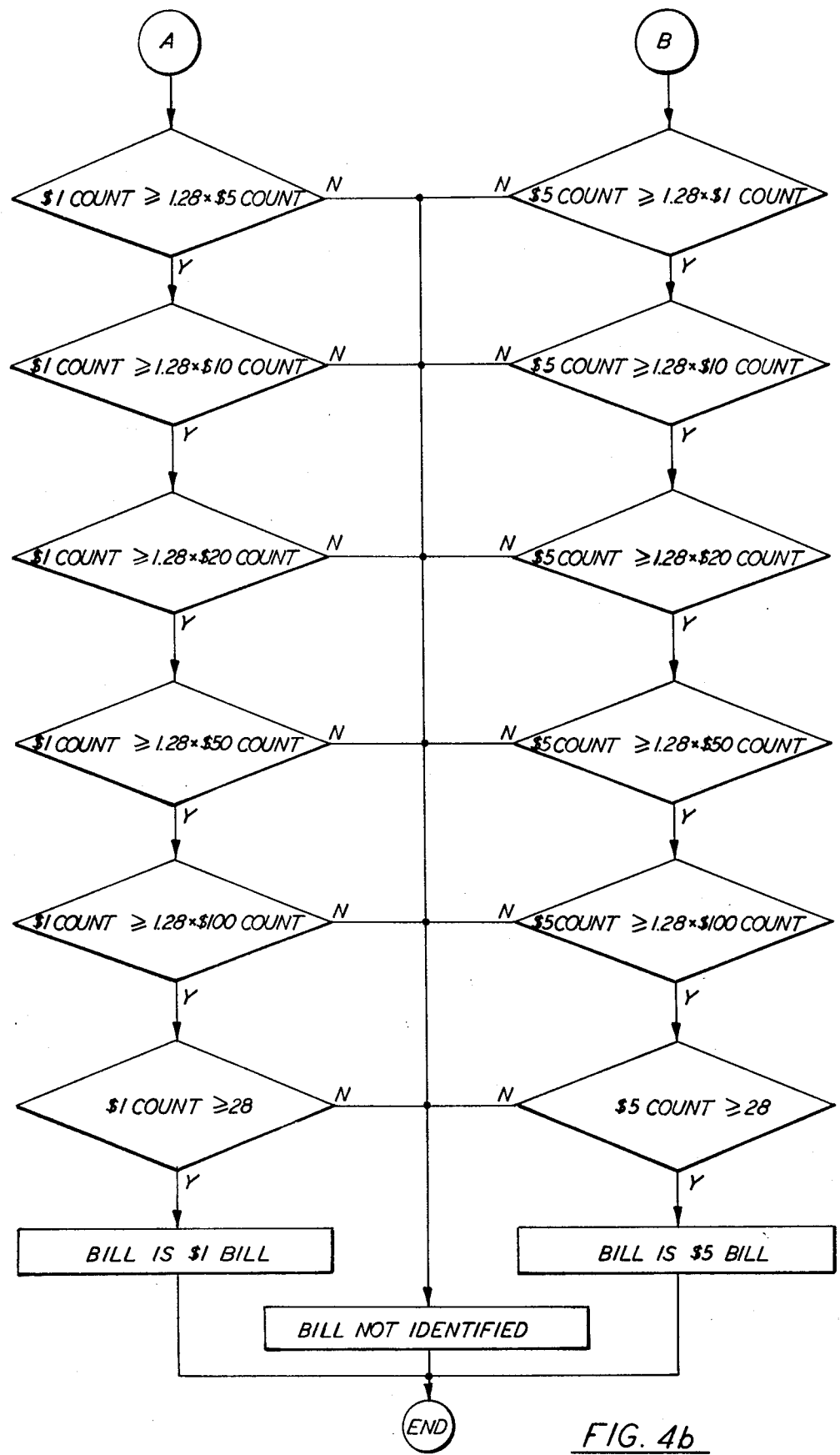
Figure 4C:
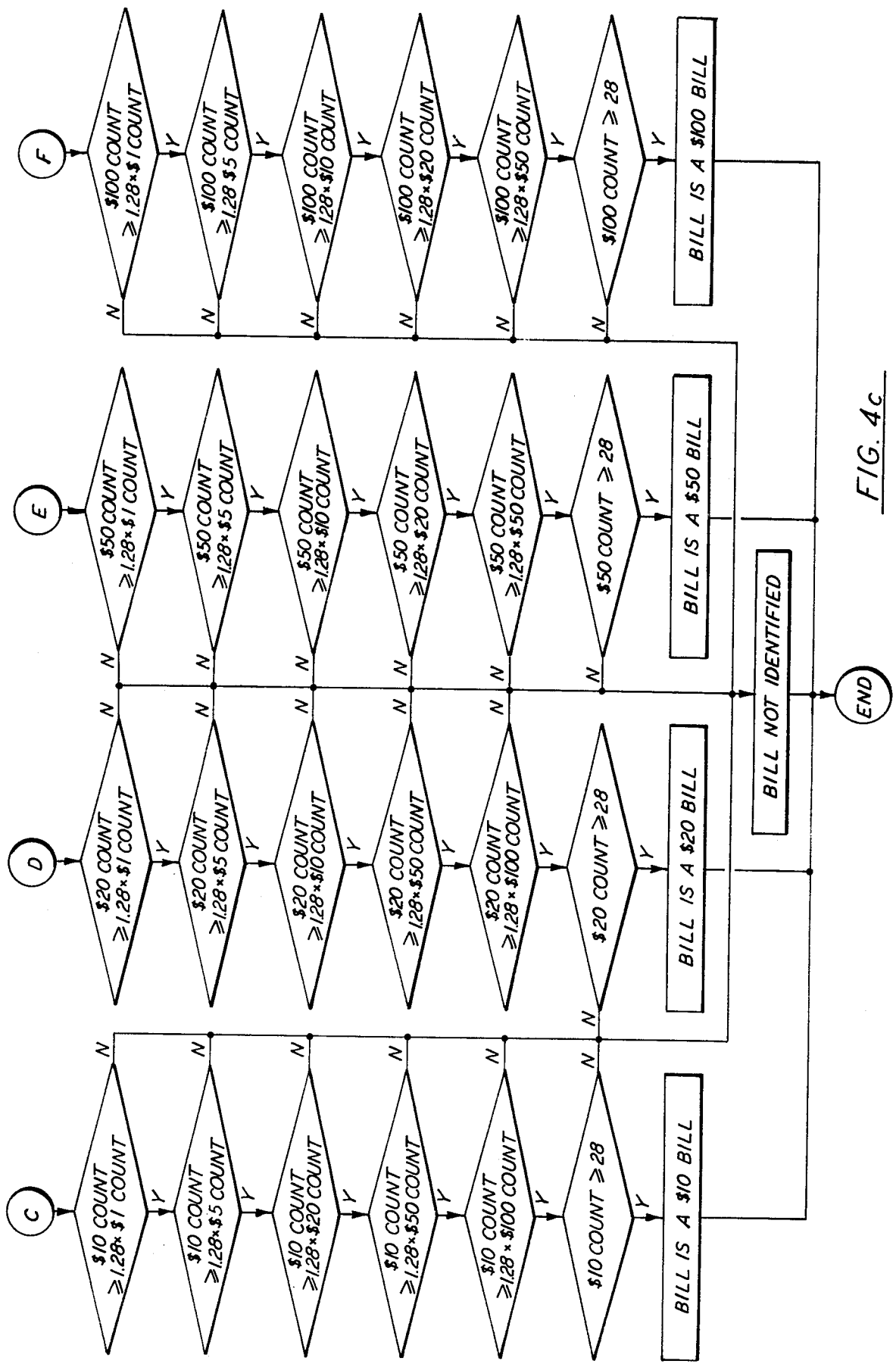

One sequence for determining whether a given count is at least 28 and at least 1.28 times larger than any other count for a particular bill is shown in FIGS. 4a, 4b and 4c. A sequence like that shown in FIG. 4a, determines which of the counts is the largest. By tracing through the decision blocks of FIGS. 4a, it will become apparent that if the control exits at point A, the $1.00 count is the largest. On the other hand, exiting at points, B, C, D, E, and F respectively corresponds to the $5.00, $10.00, $20.00, $50.00 and $100.00 counts being the largest. A similar decision sequence is required if notes are both right side up and up side down.

Referring now to FIG. 4b, when the control determines that the $1.00 count is the largest, then a determination must be made as to whether the $1.00 count is greater than or equal to 1.28 times the next largest count. The sequence shown in FIG. 4b checks whether the $1.00 count is greater than 1.28 times all the other counts. In this manner, if the answer is yes to each check and if the count is at least 28, it is certain that the bill is a $1.00 bill. The indicator is then actuated to indicate the bill identity as a $1.00 note. In the event that the $1.00 count is not at least 1.28 times all other counts, then the bill cannot be identified with sufficient accuracy and the indicator 34 is actuated to indicate that the bill cannot be identified.

In a similar manner, the control as depicted in FIG. 4b is operative when the $5.00 denomination count is the largest to compare the $5.00 count with the $1.00, $10.00, $20.00, $50.00 and $100.00 count and is at least 28, then the bill is a $5.00 bill and the indicator 34 is actuated to indicate the same.

The control 28 operates in a manner dipicted in FIG. 4c to produce an indication that the bill is a $10.00, $20.00, $50.00 or $100.00 bill where the corresponding count is at least 28 and at least 1.28 times all the other denomination counts for the particular note being tested. In the event that the largest count identified by the sequence shown in FIG. 4a is not at least 1.28 times the next largest count, or not at least 28 the bill cannot be identified and the indicator 34 is actuated to indicate the same.

Figure 5:
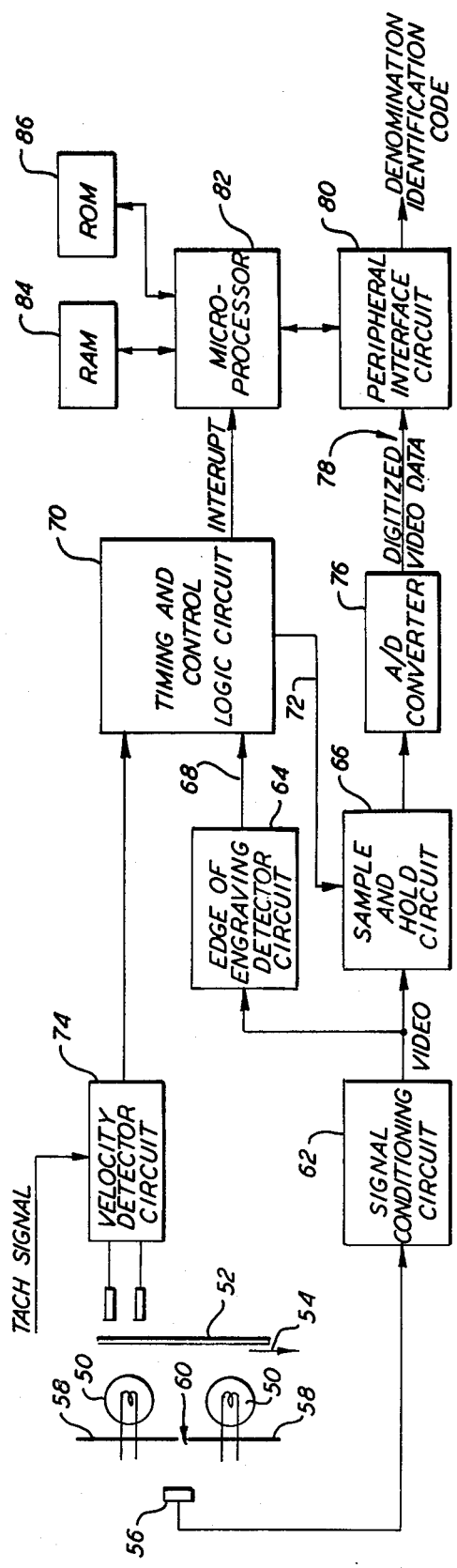
FIG. 5 is a system block diagram for the preferred embodiment of the invention.

Those of skill in the art will recognize that the sequence for the control 28 as shown in FIGS. 2, 3, 4a, 4b and 4c can be modified somewhat from that shown to achieve the same result with the circuitry shown in FIG. 1. In addition, those of skill in the art will recognize that the denomination discriminator of the present invention may readily be implemented by a circuit configuration different from that shown in FIG. 1 but will achieve the same objective. For example, a system as depicted generally in FIG. 5 will operate in the manner described above to produce the same tests as that described above although the specifics of the circuit operation are quite different. The circuit according to FIG. 5 includes at least two lamps 50 disposed in a position to illuminate a note 52 as it moves past the lamps 50 in a direction indicated by the arrow 54. The light reflected from the note 52 is sensed by a detector 56 which may comprise a type 52C solar cell manufactured by Centra-Lab. Disposed between the lamps 50 and the detector 56 is a shield 58 with a centrally disposed opening 60 through which some light reflected from the note 52 can pass. By proper placement of the detector 56, the shield 58, the note 52, and by properly selecting the size of the opening 60, the detector 56 can be made to respond only to light reflected from a given area on the note 52. As indicated earlier, the preferred embodiment of the present invention is properly dimensioned so that an area 2 millimeters wide and 80 millimeters high is "seen" by the detector 56.

A signal conditioning circuit 62 is coupled to the detector 56 and is for amplifying the analog signal received therefrom. After amplification, the video received from the detector 56 is transmitted by the signal conditioning circuit 62 to the edge of an engraving detector circuit 64 and to a sample and hold circuit 66. The edge of engraving detector circuit 64 produces a signal at its output 68 once it has determined that engraving on the bank note is in view of the detector 56.

The sample and hold circuit 66 is conditioned by a timing and control logic circuit 70 by way of a control signal which is transmitted to the sample and hold circuit 66 on line 72. When the signal appears at the sample and hold circuit 66 on line 72, the analog input to the sample and hold circuit 66 becomes stored therein. The analog signal stored in the sample and hold circuit 66 is converted by an A/D converter 76, which is coupled thereto, into digitized video data which is transmitted by way of line 78 to a peripheral interface circuit 80. When the microprocessor 82 is interrupted by the timing and control logic circuit 70 by an interrupt signal, the digital data in the peripheral interface circuit is transmitted to the microprocessor 82 which stores it in the random access memory (RAM) 84.

The microprocessor 82 is controlled by the control information found within the read only memory (ROM) 86. The sequence of events performed by the microprocessor 82 is generally the same as described above. On completing the scan of the note, the microprocessor 82 indicates to the peripheral interface circuit 80 the identity of the bank note in the form of a denomination indication code.

The details of the content of the read only memory 86 is shown below in Table 1 which operates in connection with the detailed circuit diagram shown in FIGS. 7–11.

Figure 6B:
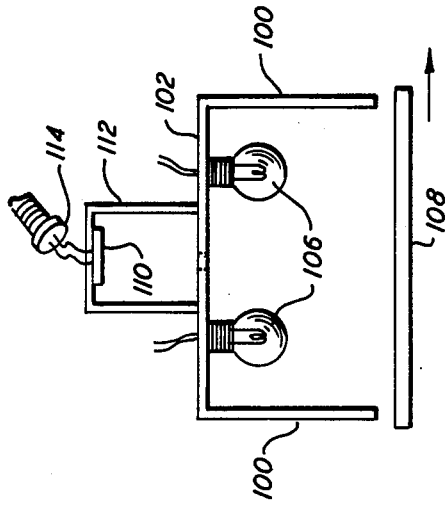
FIG. 6a shows a forward plan view and FIG. 6b shows a top plan view of a sensor used in the preferred embodiment of the invention.
Figure 6A:
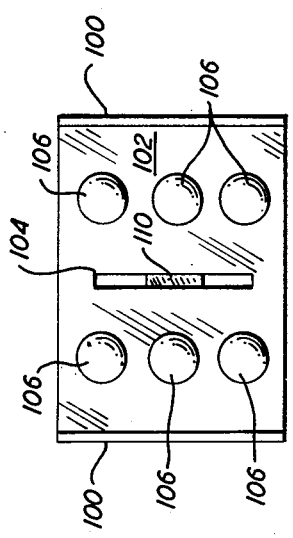
Figure 8:
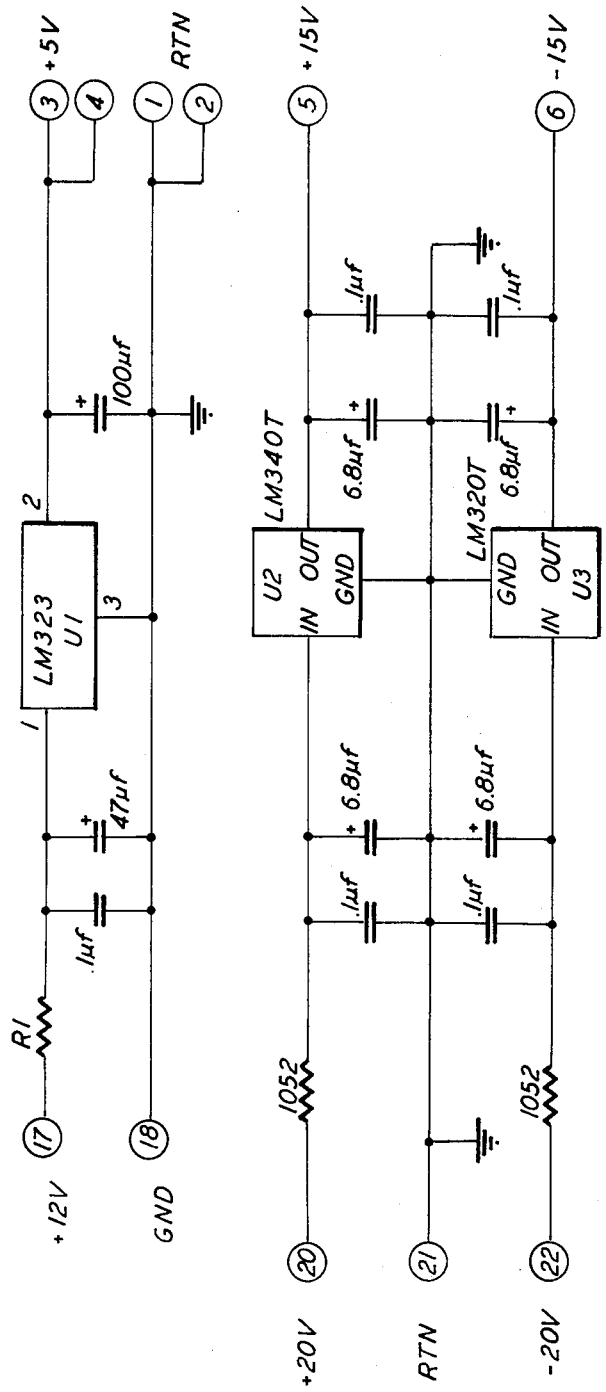
FIG. 8 is a voltage regulator for the system.
Figure 9A:
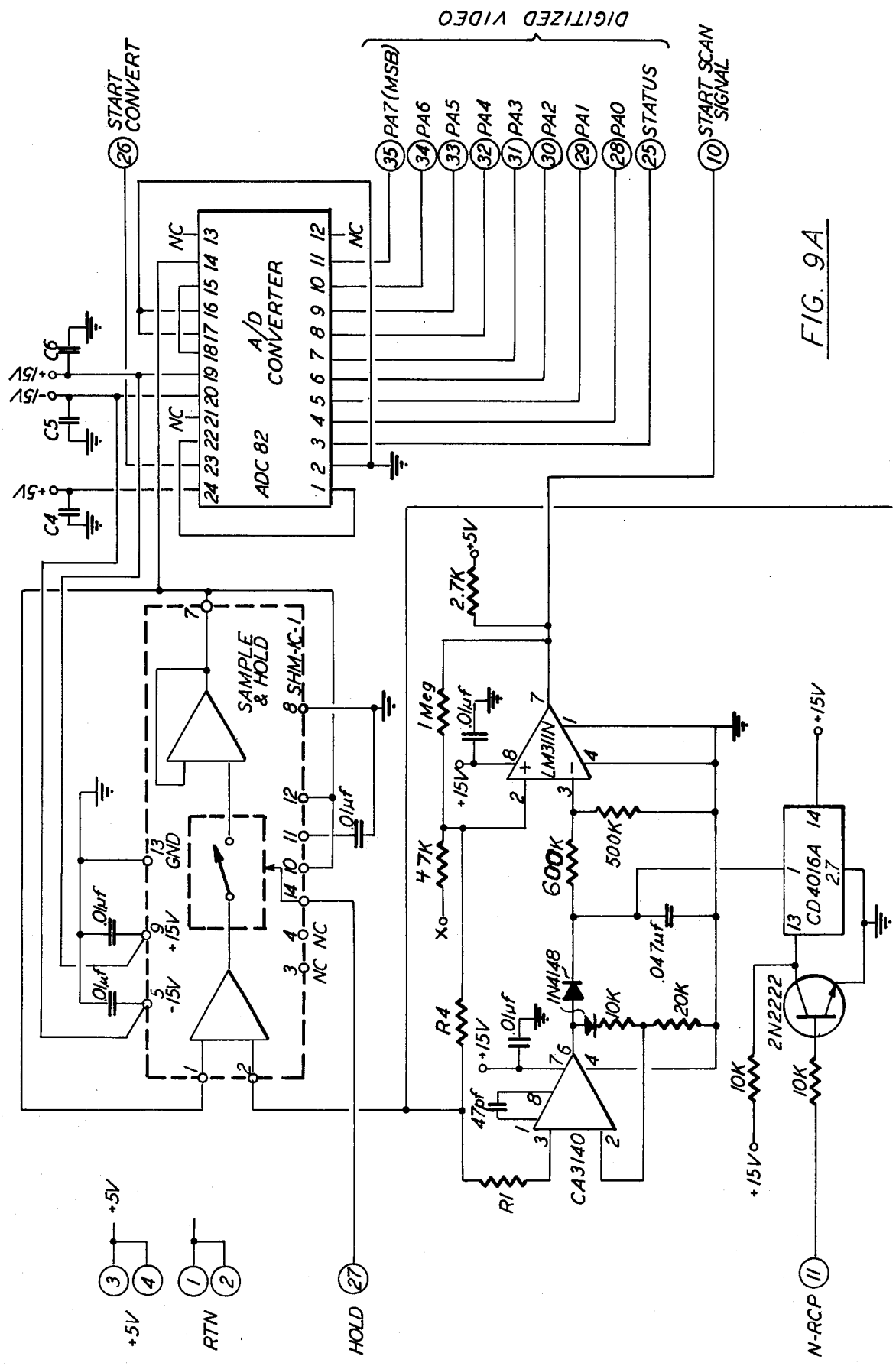
FIG. 9 shows how the analog signal processor of FIGS. 9A and 9B fit together.
Figure 10B:
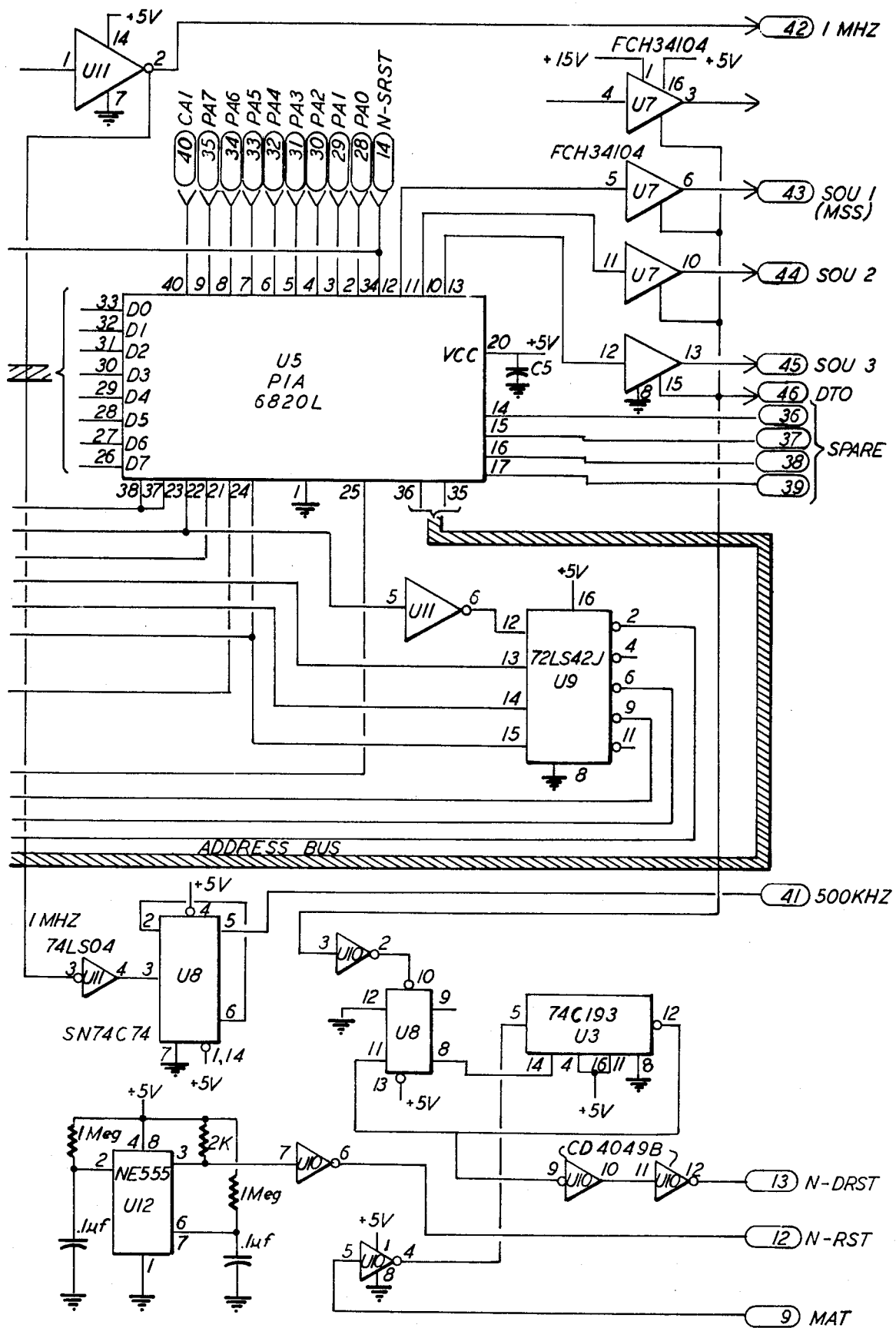
FIG. 10 shows how the main processor of FIGS. 10A and 10B fit together.
Figure 11B:
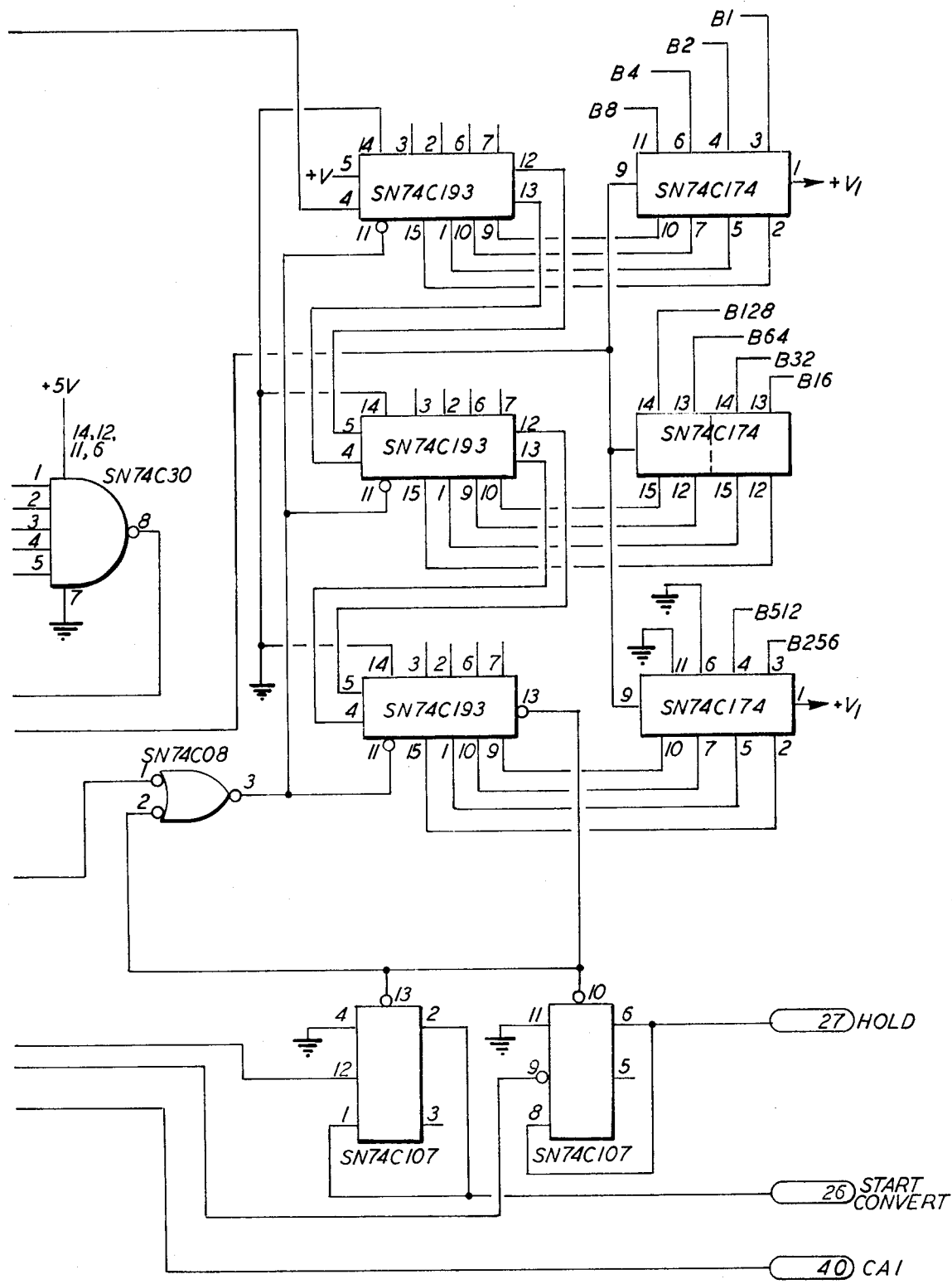
FIG. 11 shows how the digital signal processor of FIGS. 11A and 11B fit together.

Referring briefly to FIGS. 6a and 6b, a more detailed description of the detector arrangement is shown. The detector includes a pair of parallel spaced bracket members 100 which are joined by a substantially planar member 102. Centrally located on the member 102 is a slot 104 which, is viewed in FIG. 6a, is a narrow rectangular area disposed between the plurality of lamps 106 which, in operation, are turned on in order to illuminate the bill 108 as it moves by the detector.

As seen in FIG. 6a, the detector 110 is disposed on a bracket 112 which is fixed to the rear surface of the member 102. The detector 110 is positioned as viewed in FIG. 6a so as to permit light reflected from a bank note 108 to pass through the slot 104 and strike the detector 110 but light cannot hit the detector directly from the lamps 106.

According to the operation of the present invention as described above, the microprocessor 82 of FIG. 5 inputs 72 samples of digitized video data for each bank note that is scanned. Once this data is in the random access memory 84, the microprocessor 102 generates sixty-four 4-bit correlation numbers. The 4-bit correlation number is created by taking 4 one-bit differences of the present sample $P_n$ as compared with the second previous, the fourth previous, the sixth previous, and the eighth previous sample. In other words, the sample $P_n$ is compared with the second previous sample $P_{n-2}$, the fourth previous sample $P_{n-4}$, the sixth previous sample $P_{n-6}$, and the eighth previous sample $P_{n-8}$. If the sample $P_n$ is greater or equal to than the sample $P_{n-2}$, a binary one is placed into the first bit of the four bit correlation number. If $P_n$ is greater than or equal to $P_{n-4}$, then a one is placed in a second bit of the correlation number. Where $P_n$ is greater than or equal to $P_{n-6}$, a one is placed in the third bit position of the correlation number. Further, if $P_n$ is greater than or equal to $P_{n-8}$, a binary one is placed into the fourth bit position of the correlation number.

Once all the four bit correlation numbers have been generated, they are then compared with permanently stored 4-bit reference correlation numbers representing

TABLE 1

| STMT | ADDR CONTENT | STMT | ADDR CONTENT | STMT | ADDR CONTENT | STMT | ADDR CONTENT |
|---|---|---|---|---|---|---|---|
| 1 | 0000 0F | 46 | 005D 59 | 91 | 00B3 27 06 | 136 | 00FF 97 1D |
| 2 | 0001 86 07 | 47 | 005E A6 08 | 92 | 00B5 A1 00 | 137 | 0101 D7 1E |
| 3 | 0003 B7 4001 | 48 | 0060 A0 04 | 93 | 00B7 2E F6 | 138 | 0103 DB 1C |
| 4 | 0006 86 0F | 49 | 0062 26 01 | 94 | 00B9 20 F0 | 139 | 0105 99 1B |
| 5 | 0008 B7 4002 | 50 | 0064 0D | 95 | 00BB CE 0001 | 140 | 0107 97 1B |
| 6 | 000B 86 04 | 51 | 0065 59 | 96 | 00BE 96 18 | 141 | 0109 D7 1C |
| 7 | 000D B7 4003 | 52 | 0066 A6 08 | 97 | 00C0 44 | 142 | 010B 96 1D |
| 8 | 0010 8E 007F | 53 | 0068 A0 02 | 98 | 00C1 25 01 | 143 | 010D D6 1E |
| 9 | 0013 4F | 54 | 006A 26 01 | 99 | 00C3 08 | 144 | 010F 0C |
| 10 | 0014 CE 0001 | 55 | 006C 0D | 100 | 00C4 9C 17 | 145 | 0110 59 |
| 11 | 0017 A7 00 | 56 | 006D 59 | 101 | 00C6 26 02 | 146 | 0111 49 |
| 12 | 0019 08 | 57 | 006E A6 08 | 102 | 00C8 08 | 147 | 0112 0C |
| 13 | 001A 8C 000F | 58 | 0070 A0 00 | 103 | 00C9 08 | 148 | 0113 59 |
| 14 | 001D 26 F8 | 59 | 0072 2601 | 104 | 00CA DF 19 | 149 | 0114 49 |
| 15 | 001F CE 83FF | 60 | 0074 0D | 105 | 00CC A6 00 | 150 | 0115 97 1D |
| 16 | 0022 DF 13 | 61 | 0075 59 | 106 | 00CE 08 | 151 | 0117 D7 1E |
| 17 | 0024 00 1E | 62 | 0076 53 | 107 | 00CF 08 | 152 | 0119 DB 1C |
| 18 | 0027 DF 15 | 63 | 0077 DE 13 | 108 | 00D0 8C 000F | 153 | 011B 99 1B |
| 19 | 0029 DF 0F | 64 | 0079 7F 001A | 109 | 00D3 27 0F | 154 | 011D 97 1B |
| 20 | 002B CE 0026 | 65 | 007C 7F 0019 | 110 | 00D5 8C 0010 | 155 | 011F D7 1C |
| 21 | 002E DF 11 | 66 | 007F 7C 001A | 111 | 00D8 27 0A | 156 | 0121 96 1D |
| 22 | 0030 0E | 67 | 0082 96 1A | 112 | 00DA 9C 17 | 157 | 0123 D6 1E |
| 23 | 0031 96 16 | 68 | 0084 81 0F | 113 | 00DC 27 F0 | 158 | 0125 0C |
| 24 | 0033 2B 04 | 69 | 0086 27 0F | 114 | 00DE A1 00 | 159 | 0126 59 |
| 25 | 0035 81 1F | 70 | 0088 08 | 115 | 00E0 2E EC | 160 | 0127 49 |
| 26 | 0037 2D F8 | 71 | 0089 E1 00 | 116 | 00E2 20 E6 | 161 | 0128 DB 1C |
| 27 | 0039 86 08 | 72 | 008B 26 0A | 117 | 00E4 DE 17 | 162 | 012A 99 1B |
| 28 | 003B B7 4002 | 73 | 008D DF 17 | 118 | 00E6 A6 00 | 163 | 012C 97 1B |
| 29 | 003E 96 16 | 74 | 008F DE 19 | 119 | 00E8 81 14 | 164 | 012E D7 1C |
| 30 | 0040 2B 04 | 75 | 0091 6C 00 | 120 | 00EA 2D 52 | 165 | 0130 DE 17 |
| 31 | 0042 81 27 | 76 | 0093 DE 17 | 121 | 00EC DE 19 | 166 | 0132 A6 00 |
| 32 | 0044 2D F8 | 77 | 0095 20 E8 | 122 | 00EE A6 00 | 167 | 0134 91 1B |
| 33 | 0046 DE 11 | 78 | 0097 DF 13 | 123 | 00F0 5F | 168 | 0136 2E 09 |
| 34 | 0048 9C 15 | 79 | 0099 DE 11 | 124 | 00F1 97 1B | 169 | 0138 26 04 |
| 35 | 004A 27 FC | 80 | 009B 8C 0066 | 125 | 00F3 D7 1C | 170 | 013A D6 1C |
| 36 | 004C 08 | 81 | 009E 27 03 | 126 | 00F5 44 | 171 | 013C 27 03 |
| 37 | 004D DF 11 | 82 | 00A0 7E 0048 | 127 | 00F6 56 | 172 | 013E 4F |
| 38 | 004F DE 0F | 83 | 00A3 0F | 128 | 00F7 44 | 173 | 013F 20 02 |
| 39 | 0051 08 | 84 | 00A4 4F | 129 | 00F8 56 | 174 | 0141 96 18 |
| 40 | 0052 DF 0F | 85 | 00A5 B7 4002 | 130 | 00F9 44 | 175 | 0143 4C |
| 41 | 0054 C6 0F | 86 | 00A8 CE 0001 | 131 | 00FA 56 | 176 | 0144 44 |
| 42 | 0056 A6 08 | 87 | 00AB DF 17 | 132 | 00FB 44 | 177 | 0145 B7 4002 |
| 43 | 0058 A0 06 | 88 | 00AD A6 00 | 133 | 00FC 56 | 178 | 0148 20 FE |
| 44 | 005A 26 01 | 89 | 00AF 08 | 134 | 00FD 44 | | |
| 45 | 005C 0D | 90 | 00B0 8C 000F | 135 | 00FE 56 | | | the corresponding element of each denomination. If a match exists between the test correlation number and the reference correlation number, a correlation of that sample with the reference is said to exist and a correlation count for that denomination of bank note is incremented. There are a plurality of such tests performed for each sample and they correspond to one test for each donomination which can be discriminated by the apparatus when the bill is right side up and a corresponding number for when the bill is upside down.

Once the last sample correlation number has been generated and compared with the corresponding reference correlation numbers, the microprocessor determines the denomination based on the following two criteria. If the ratio of the highest denomination count to the next highest denomination count equals or exceeds 1.28, then the denomination can only be that corresponding to the highest count. If this ratio is less than 1.28, the bill is classified as being unknown. The second acceptance cirteria is that the largest denomination count for the test bill must equal or exceed 28. If both criteria are met, the microprocessor 82 actuates the pheripheral interface 80 to produce a denomination identification code on the line so indicated.

FIGS. 7-11 show in complete detail an implementation of the present invention wherein all circuit types are given their parameter value or commercial designation for reader convenience and is not intended as a limitation on component value or type nor as a restricution on the scope of the invention.

Those of skill in the art will readily recognize that the foregoing description of preferred embodiments of the present invention is merely exemplary of the invention and that other configurations can readily be conceived without departing from the spirit and the scope of the invention as defined in the following claims.

What is claimed is:

1. Apparatus for identifying the denomination of a bank note or the like comprising, in combination:
   means for directing a source of light onto one surface of the bank note whose denomination is to be determined;
   means for measuring the reflectance of light from a plurality of incremental areas disposed across the length of the bank note whose denomination is to be determined;
   means for comparing the reflectance of light from each incremental area with the reflectance of light from each of a preselected plurality of other incremental areas of said bank note taken in a preselected sequence and producing a first correlation signal responsive to said comparisons for each incremental area; and
   means for comparing said first correlation signals to second reference correlation signals corresponding to each denomination identifiable by the apparatus to determine the denomination of the bank note to be identified.

2. Apparatus for identifying the denomination of a bank note or the like according to claim 1, further comprising means for generating a third signal responsive to the degree of correlation between said first correlation signals and said second reference correlation signals; and
   means for comparing said third signal to a preselected standard to determine the reliability of the denomination determination of the bank note.

3. Apparatus for identifying the denomination of a bank note or the like according to claim 2, wherein said means for generating a third signal responsive to the degree of correlation comprises means for incrementing a denomination count when the first correlation signals correspond to the second reference correlation signals; and
   means for determining and outputting, after all denomination counts have been incremented to their highest possible value for the bank note to be identified, the denomination count which is at least 28 and at least 1.28 times larger than the next largest denomination count.

4. Apparatus for identifying the denomination of a bank note or the like according to claim 1 or claim 2 or claim 3, wherein said means for comparing the reflectance of light from each incremental area with the reflectance of light from each of a preselected plurality of other incremental areas taken in a preselected sequence and producing a first correlation signal responsive to said comparisons for each incremental area comprises means for producing a binary first correlation signal with binary 1 for each comparison where the light reflected from the incremental area is larger than or equal that reflected from a previous incremental area and with a binary 0 for each comparison where the light reflected from the incremental area is less than the light reflected from a previous incremental area.

5. Apparatus for identifying the denomination of a bank note or the like according to claim 4, wherein said previous incremental areas are the second, fourth, sixth and eight previous incremental areas.

6. An apparatus for identifying the denomination of a bank note comprising, in combination:
   means to produce a signal $P_n$ whose magnitude is proportioned to the reflectance of light from an area of a bank note;
   means to store a representation for the reflectance of light from each of a plurality of different areas on the bank note;
   means to form a plurality of multi-bit correlation numbers N, where the first bit of each number is a one if $P_n > P_{n-2}$ otherwise it is a zero, the second bit of each number is a one if $P_n > P_{n-4}$ otherwise said second bit is zero, the third bit of each number is a one if $P_n > P_{n-6}$ otherwise said third bit is zero and the fourth bit of each number is a one of $P_n > P_{n-8}$ otherwise said fourth bit is zero where $P_n$ is the stored representation for the reflectance of light from a given area, $P_{n-2}$ is the stored representation for the reflectance of light from the the second previous given area, $P_{n-4}$ is the stored representation for the reflectance from the fourth previous given area and $P_{n-6}$ is the stored representation for the reflectance from the sixth previous given area and $P_{n-8}$ is the stored representation for the reflectance from the eighth previous given area;
   means to compare each said multi-bit correlation number N with a multi-bit number which corresponds to the same four bit number derived from a sample note of each denomination of bank note detected by the apparatus and on a favorable comparison, a denomination count is incremented for the corresponding denomination; and
   means to produce an identity signal correlated to the identified denomination if the denomination count for such denomination is at least equal to 28 and at least 1.28 times any other denomination count.

7. An apparatus for identifying the denomination of a bank note or the like comprising, in combination:
   means to direct light onto one side of the bank note to be identified;
   means to measure in sequence the reflected light from a plurality of incremental areas disposed across said one side of the bank note to be identified;
   means for comparing the light reflected from each of said incremental areas with the second, fourth, sixth and eighth previous incremental areas and producing a correlation number with a binary 1 for each comparison where the light reflected from the incremental area is larger than or equal that reflected from a previous incremental area and with a binary 0 for each comparison where the light reflected from the incremental area is less than the light reflected from a previous incremental area;
   means for comparing each correlation number with a corresponding correlation number for each denomination identifiable by the apparatus;
   means for incrementing a denomination count when the produced correlation number corresponds to a corresponding correlation number; and
   means for determining, after all denomination counts have been incremented to their highest possible value for the bank note to be identified, the denomination count which is at least 28 and at least 1.28 times larger than the next largest denomination count.

8. The apparatus of claim 7 additionally including means to output an indication of the denomination correlated to the denomination count that is at least 28 and at least 1.28 times larger than the next smallest denomination count.

9. A method for determining the denomination of a bank note comprising the steps of:
   directing a source of light onto one surface of the bank note whose denomination is to be determined;
   measuring the light reflected from a plurality of incremental areas disposed across the length of the bank note whose denomination is to be determined;
   comparing the reflectance of light from each incremental are with the reflectance of light from the second, fourth, sixth, and eighth previous incremental areas and producing a word with a binary 1 for each comparison where the reflectance for the incremental area is a larger than or equal to the reflectance from a previous incremental area and a binary 0 for each comparison when the reflectance is less than the reflectance for a previous incremental area;
   comparing the produced word with the corresponding word for each denomination bank note that can be discriminated;
   counting the number of times the produced word compares identically with a corresponding word for each denomination note that can be discriminated;
   determining if the largest count is at least 28 and at least 1.28 times larger than any other count; and
   indicating, if the largest count is at least 28 and at least 1.28 times larger than any other count, the denomination corresponding to that for which the count is largest.

* * * * *

UNITED STATES PATENT AND TRADEMARK OFFICE
CERTIFICATE OF CORRECTION

PATENT NO. : 4,288,781
DATED : September 8, 1981
INVENTOR(S) : Harvey R. Sellner and Robert T. Wada It is certified that error appears in the above-identified patent and that said Letters Patent are hereby corrected as shown below:

Column 2, line 58, after moving insert --in --

Column 6, line 4, after count insert -- . If the $5.00 count is at least 1.28 times the $1.00, $10.00, $20.00, $50,00 and $100.00 count--

Signed and Sealed this

Sixth Day of April 1982

[SEAL]

Attest:

GERALD J. MOSSINGHOFF

Attesting Officer

Commissioner of Patents and Trademarks